March 31, 1925.  
I. M. LADDON  
LANDING GEAR  
Filed March 29, 1923   2 Sheets-Sheet 1
1,531,619
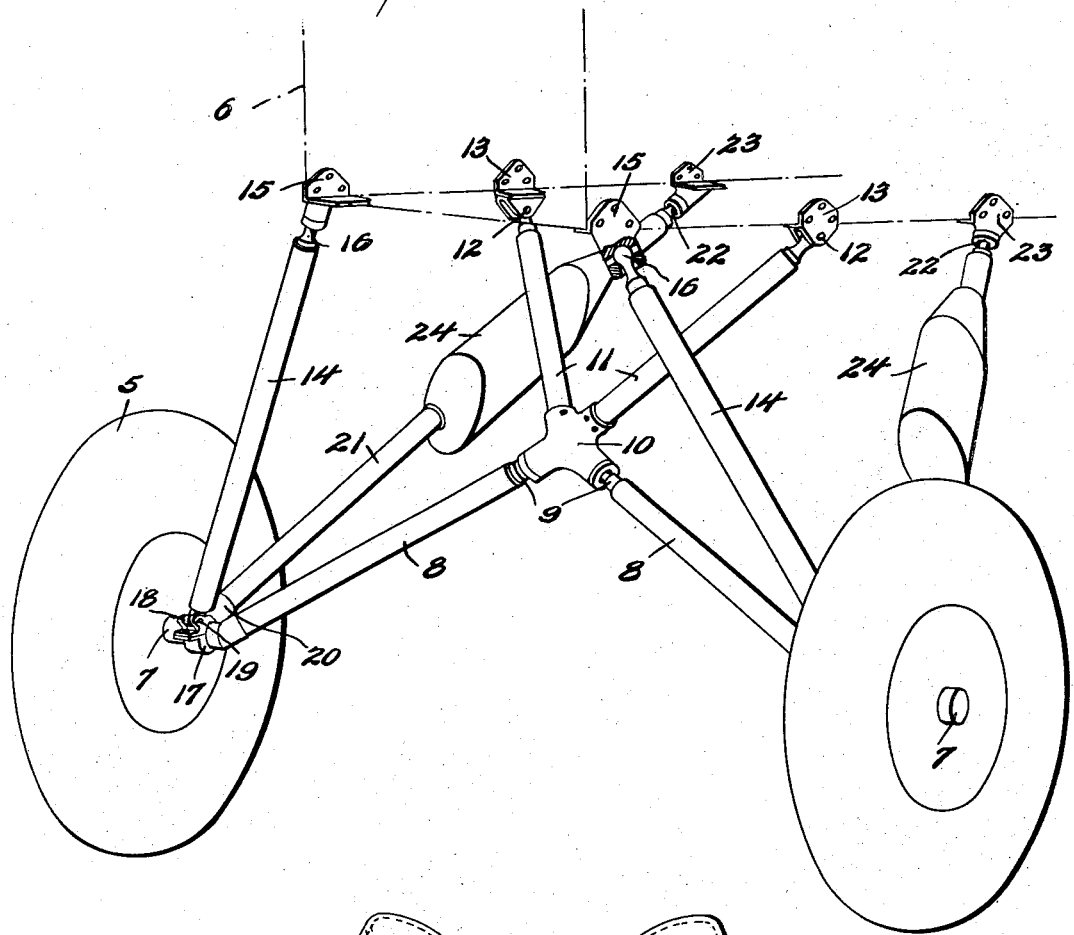
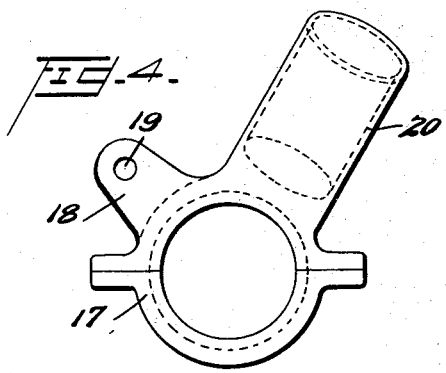
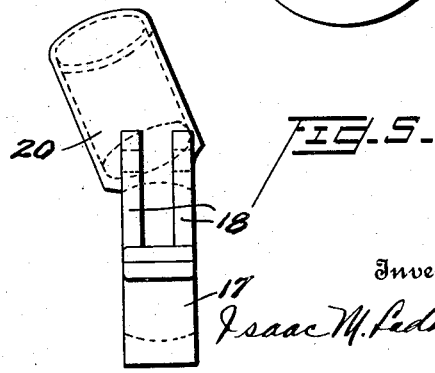
Inventor  
Isaac M. Laddon,  
By  
Albert H. Young  
Attorney

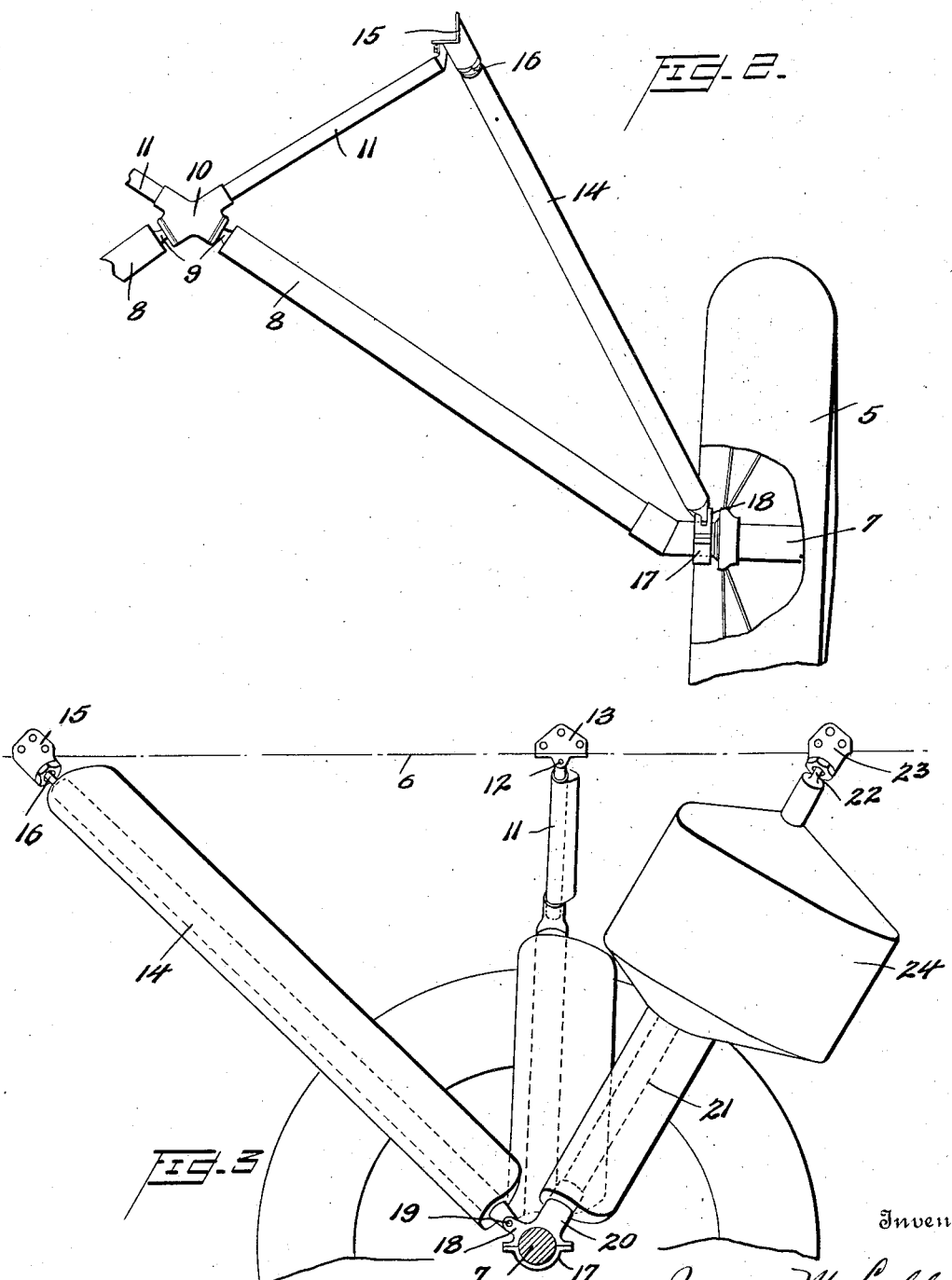

Patented Mar. 31, 1925.

1,531,619

UNITED STATES PATENT OFFICE.

ISAAC MACHLIN LADDON, OF DAYTON, OHIO.

LANDING GEAR.

Application filed March 29, 1923. Serial No. 628,522.

*To all whom it may concern:*

Be it known that I, ISAAC M. LADDON, a citizen of the United States, residing at Dayton, in the county of Montgomery and State of Ohio, have invented certain new and useful Improvements in Landing Gears, of which the following is a specification.

This invention relates to landing gears for aircraft and is especially designed for use as a small landing gear or landing gear for small machines, although it will be obvious, as the description proceeds, that the landing gear may be very well adapted to machines of a larger size.

One of the main objects of the invention is to produce a landing gear for small airplanes which eliminates the low down axle thereby enabling the machine to be propelled across a field without serious resistance, due to weeds, high grass and the like.

A further object of the invention is to produce a landing gear of the type above referred to which will embody great flexibility and adaptability under all ordinary conditions, enabling severe landings to be made and a quicker get-away to be obtained.

Another object of the invention is to produce a landing gear of the kind above referred to which may be easily, quickly and securely applied to the fuselage or body of an airplane and as easily removed therefrom.

With the above and other objects in view, the invention consists in the novel construction, combination and arrangement herein fully described, shown and claimed.

In the accompanying drawings—

Figure 1 is a perspective view of the improved landing gear;

Figure 2 is an enlarged fragmentary front elevation thereof;

Figure 3 is a side elevation of the same partly broken away;

Figures 4 and 5 are detail elevations of one of the spindle fittings.

In the illustrated embodiment of the invention I have shown only two ground contact elements 5 in the form of wheels, although it will be apparent that more of such contact elements may be employed if found necessary.

The wheels 5 in a small machine are located equidistantly at opposite sides of the plane of symmetry of the machine and are connected with the body or fuselage 6 of the machine by means of an interposed multiple strut formation or system which will now be described.

The wheels 5 are journaled upon the spindles 7 of a pair of axle members and which extend inwardly and upwardly and have their upper extremities connected by universal joints 9 to a fitting 10 to which are rigidly fastened the lower convergent extremities of a pair of mid strut members 11. The strut members 11 diverge upwardly and laterally and are connected by pins or pivots 12 to fittings 13 fastened to the body or fuselage 6 and preferably to the lower longérons thereof.

Forwardly and upwardly inclined struts 14 extend from the spindle ends of the axle members 8 to fittings 15 fastened to the fuselage, as shown, and to which they are connected by universal joints 16. The members 8 and 14 at each side are connected by a special fitting 17 shown in detail in Figures 4 and 5, the forward strut 14 being fastened to one or more lugs 18 on the fittings 17 by means of a pin 19 forming a pivot joint. The fitting 18 also comprises a tubular extension 20 into which is fitted the forward extremity of one of a pair of rear struts 21 each connected by universal joint 22 to a fitting 23 fastened to the fuselage. Each of the struts 21 embodies in the construction thereof a shock absorber 24, the details of which are not shown, as the shock absorber per se forms no part of the present invention. The shock absorber 24 is covered by a stream-line housing and the several struts and axle members hereinbefore referred to are also provided with ferrings or stream-line housing, as shown which housing incloses the tubular body portions of said axle members and forward and rear struts.

From the foregoing description, taken in connection with the accompany drawings, it will now be seen that the ground contact elements 5, which may consist of either wheels or runners, are adapted to move outwardly or laterally away from each other and also adapted to yield upwardly and rearwardly, this being provided for by the several universal joints shown and described, and the shock absorbers. This renders the landing gear particularly flexible and facilitates both the launching of the machine in flight and the safe landing thereof by eliminating the low down axle so commonly used, the machine is able to negotiate rough fields and fields containing high grass, weeds and the like.

I claim—

1. In aircraft landing gear, ground contact wheels arranged in spaced relation to each other, a mid strut assembly embodying a hanger attached to the body of the craft, and axle members extending laterally from said hanger to which they are connected by universal joints, and inclining downwardly and carrying spindles for the wheels, and other struts extending in a general fore and aft direction between the spindle ends of said axle members and the body of the craft.

2. In aircraft landing gear, ground contact wheels arranged in spaced relation to each other, a mid strut assembly embodying a hanger attached to the body of the craft, and axle members extending laterally from said hanger and inclining downwardly and carrying spindles for the wheels, and other struts extending in a general fore and aft direction between the spindle ends of said axle members and the body of the craft, said axle members and struts having their upper ends held by universal joints.

3. In aircraft landing gear, ground contact wheels arranged in spaced relation to each other, a mid strut assembly embodying a hanger attached to the body of the craft, and axle members extending laterally from said hanger, and inclining downwardly and carrying spindles for the wheels, the upper ends of said axle members being connected to the hanger by universal joints, and other struts extending in a general fore and aft direction between the spindle ends of said axle members and the body of the craft.

4. In aircraft landing gear, ground contact wheels arranged in spaced relation to each other, a mid strut assembly embodying a hanger oscillatably attached to the body of the craft, and axle members extending laterally from said hanger to which they are connected by universal joints and inclining downwardly and carrying spindles for the wheels, and other struts extending in a general fore and aft direction between the spindle ends of said axle members and the body of the craft and embodying shock-absorbing means.

5. In aircraft landing gear, ground contact wheels arranged in spaced relation to each other, and a multiple strut formation between said wheels and the body of the craft permitting the wheels, under restraint, to move outwardly, upwardly and rearwardly, said strut formation comprising a mid strut assembly embodying a hanger attached to the body of the craft, and axle members extending laterally from said hanger and inclining downwardly and carrying spindles for the wheels, and other struts extending in a general fore and aft direction between the spindle ends of said axle members and the body of the craft.

In testimony whereof I affix my signature.

ISAAC MACHLIN LADDON.